United States Patent
Cheret et al.

(10) Patent No.: US 6,242,519 B1
(45) Date of Patent: Jun. 5, 2001

(54) POLYESTER MOLDING COMPOSITION

(75) Inventors: Estelle Cheret, Bergen Op Zoom; Richard De Vries, Prinsenbeek; Frans Mercx, Bergen Op Zoom, all of (NL); Vladimir Kwiecinski, Schilde (BE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/231,104

(22) Filed: Jan. 14, 1999

(51) Int. Cl.$^7$ ....................................................... C08K 5/04
(52) U.S. Cl. ......................... 524/396; 523/201; 524/451; 524/494
(58) Field of Search .............................. 523/201; 524/396, 524/451, 494

(56) References Cited

U.S. PATENT DOCUMENTS

| | | |
|---|---|---|
| 2,465,319 | 3/1949 | Whinfield et al. . |
| 3,047,539 | 7/1962 | Pengilly . |
| 3,655,824 | 4/1972 | Kato et al. . |
| 3,830,878 | 8/1974 | Kato et al. . |
| 3,944,631 | 3/1976 | Yu et al. . |
| 3,991,009 | 11/1976 | Margotte et al. . |
| 4,096,202 | 6/1978 | Farnham et al. . |
| 4,148,956 | 4/1979 | Breitenfellner et al. . |
| 4,351,757 * | 9/1982 | Hoeschele ............................ 524/169 |
| 4,362,839 * | 12/1982 | Tonoki ................................. 524/513 |
| 4,409,363 | 10/1983 | Brandstetter et al. . |
| 4,433,102 | 2/1984 | Brandstetter et al. . |
| 4,442,263 | 4/1984 | Brandstetter et al. . |
| 4,636,544 | 1/1987 | Hepp . |
| 4,668,732 * | 5/1987 | Kuno .................................. 524/497 |
| 4,894,416 | 1/1990 | Gallucci . |
| 5,219,915 | 6/1993 | McKee et al. . |
| 5,356,972 * | 10/1994 | Sperling ............................. 524/313 |
| 5,596,049 | 1/1997 | Gallucci et al. . |
| 5,733,959 | 3/1998 | Heitz et al. . |
| 5,852,155 | 12/1998 | Bussink et al. . |

FOREIGN PATENT DOCUMENTS

| | | |
|---|---|---|
| 0046052A2 | 8/1981 | (EP) . |
| 0194080A1 | 9/1986 | (EP) . |
| 0310956A2 | 9/1988 | (EP) . |
| 0392357A2 | 4/1990 | (EP) . |
| 0539325A1 | 10/1992 | (EP) . |
| 0643104A2 | 9/1994 | (EP) . |
| 5287181 | 11/1993 | (JP) . |

* cited by examiner

*Primary Examiner*—Paul R. Michl

(57) ABSTRACT

A thermoplastic glass filled resin composition having improved heat distortion properties consisting essentially of a resin blend consisting essentially of an alkylene aryl polyester, a core-shell ASA (acrylate-styrene-acrylonitrile interpolymer) and an effective amount of talc, polyesteramide, or dicarboxylic acid salt for enhancing the heat distortion properties of the resin.

27 Claims, No Drawings

POLYESTER MOLDING COMPOSITION

FIELD OF THE INVENTION

The invention relates to a molding composition comprising a glass filled polyester resin including an impact modifier.

BACKGROUND OF THE INVENTION

For thermoplastic polyester resins, the fibrous glass enhances the mechanical properties of the resin. Glass filled crystalline resin blends are difficult to mold due to a combination of poor mold flow and shear sensitivity. The crystalline resin has poor melt strength and high shrinkage upon cooling. This makes it difficult to obtain good dimensional tolerances. Typically, extruded blends also have a very rough surface and poor impact strength.

Unfortunately, in such resins, the addition of glass fibers can substantially lower the Izod impact strengths of the fiber reinforced compositions, and, also, substantially reduce the biaxial impact (instrument impact) energies of such compositions.

In order to achieve improved properties, especially impact strength, impact modifiers for poly(alkylene terephthalates) include rubbers of polybutadiene, butadiene-styrene copolymers, butadiene-acrylonitrile copolymers, ethylene-propylene rubbers, polyisobutene and polyisoprene.

U.S. Pat. No. 4,096,202 to Franham et al describes modifiers based on acrylic rubbers for improving impact strength without significantly increasing melt viscosity for poly(alkylene terephthalates). The impact modifier is a multi-phase composite interpolymer comprising a cross linked acrylic first stage which also contains graftlinking monomer and a final rigid thermoplastic phase. The crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. Among effective graftlinking monomers, which are polyethylenically unsaturated monomers, are allyl group-containing monomers of allyl esters of ethyleneically unsaturated acids such as allyl acrylate, allyl methacrylate, dially maleate, dially fumarate, diallyl itaconate, allyl acid maleate, allyl acid fumarate, and allyl acid itaconate. The resulting multi-phase composite interpolymer is known in the art as an ASA polymer.

U.S. Pat. No. 5,219,915 to McKee et al. relates to glass fiber-reinforced thermoplastic molding materials based on polyesters and graft polymers. The thermoplastic molding materials based on a mixture of polybutylene terephthalate and polyethylene terephthalate as essential components, graft polymers having acrylate rubbers as the grafting base, copolymers of vinylaromatic monomers and acrylonitrile or methacrylonitrile and glass fibers. As set forth, the compositions of both Examples also contained the following additives (in each case in % by weight, based on the total weight of A)+B)): 1.5% by weight of carbon black, 0.1% by weight of talc, 0.8% by weight of pentaerythritol stearate.

U.S. Pat. No. 4,148,956 to Breitenfellner relates to thermoplastic molding compositions of linear polyesters and styrene/ acrylonitrile modified by alpha-methylstyrene and/or acrylates. Disclosed are "inert additives of all types, for example fillers such as talc, calcium carbonate, barium sulphate, $SiO_2$, kaolin, micromica, wollastonite and metal powders, and reinforcing fillers, such as glass fibers and glass beads, inorganic or organic pigments, optical brighteners, delustering agents, processing auxiliaries, such as lubricants, mould release agents and agents which promote crystallization, flameproofing agents, nucleating agents and stabilizers, such as phosphorus-organic compounds, for example triphenyl phosphite, can be added during working up of the polyester melt or even prior to the polycondensation reaction or during mixing of the polyesters with modified styrene/ acrylonitrile. "

U.S. Pat. No 5,733,959 to Heitz, et al. relates to thermoplastic molding compositions comprise from 20 to 99% by weight of a polyester, up to 90% by weight of which may be replaced by a polycarbonate or a polyamide, from 0.1 to 7% by weight of a carbodiimide. The compositions may contain impact modifiers which are generally copolymers, preferably built up from at least two of the following monomers: ethylene, propylene, butadiene, isobutene, isoprene, chloroprene, vinyl acetate, styrene, acrylonitrile and (meth) acrylates having from 1 to 18 carbon atoms in the alcohol component.

U.S. Pat. No 5,596,049 to Gallucci et al. describes the stabilization of polyesters using epoxy compounds in combination with a catalyst. The disclosed polyester composition comprises a linear polyester resin, a difunctional epoxy compound and a catalyst. The difunctional epoxy compound has two terminal epoxy functionalities. Examples of preferred difunctional epoxy compounds are 3,4-epoxycyclohexyl-3,4-epoxycyclohexylcarboxylate, bis(3,4-epoxycyclohexylmethyl) adipate, vinylcyclohexene di-epoxide, bisphenol diglycidyl ethers, diglycidyl adducts of amines and amides, diglycidyl adducts of carboxylic acids and the like. Especially preferred is 3,4-epoxycyclohexyl-3,4 epoxycyclohexylcarboxylate.

U.S. Pat. No. 4,894,416 to Gallucci relates to low gloss thermoplastic blends with good physical properties consisting of a blend of ASA and a gloss-reducing amount of a glycidyl (meth)acrylate copolymer.

Polyesteramides are described in EP 445 548 B1 as well as in U.S. Pat. No. 5,852,155 to Bussink et al. and in copending patent application U.S. Ser. No. 09/16076, filed Sep. 25, 1998 to Chisholm et al entitled Amide Modified Polyesters.

The prior art focus is to add various ingredients to enhance the properties of the polyester material. However, with this approach, it is difficult to achieve the desired improvement in properties. The addition of one ingredient may improve one property but result in the degradation of another desirable property. As a result, a combination of various ingredients are added which further complicates the production of a consistent product due to the interactions of the various ingredients with one another.

As an example of an additive used to improve properties, it is known to add impact modifiers to polyester resins to improve the ductility or the notched Izod impact strength thereof. However the effect of such impact modifiers on reinforcing polyester resin compositions, such as those containing 20% by weight of reinforcing glass fibers, is not sufficient to result in the desired improvement in heat distortion temperature.

Accordingly, there is a need for simple glass reinforced polyester resin compositions which exhibit consistent and uniform properties together with enhanced properties of improve Heat Distortion temperature which may be tested according to ISO 75-1 test.

SUMMARY OF THE INVENTION

We have found that modification of a polyester/ASA resin with a heat distortion improving agent gives glass filled blends that have surprisingly improved heat distortion as compared to a polyester resin absent the agent. These blends still have high impact strength, good stiffness and mechanical properties along with good appearance and processability.

In accordance with the present invention, there is provided a thermoplastic glass filled resin composition having improved heat distortion properties consisting essentially of a resin blend consisting essentially of an alkylene aryl polyester, a core-shell ASA (acrylate-styrene-acrylonitrile interpolymer) and an effective amount of a heat distortion improving agent for enhancing the properties of the resin.

DETAILED DESCRIPTION OF PREFERRED EMBODIMENTS

In accordance with the principles of the present invention, the thermoplastic resin blend of an alkylene aryl polyester and a core-shell ASA includes an effective amount of heat distortion improving agent. Typically the agent is utilized in amounts from about 0.0001 to about 0.03 parts by weight (pbw) based on the total weight of the composition. The preferred heat distortion improving agents are talc, salt of carboxcylic acid, or polyesteramide are uniformly dispersed in the resin for enhancing the heat distortion properties of the resin. Other agents include phthalocyanines, N,N'-bis(methoxycarbonylbenzoyl)-1,4-butanediamine, alkali metal carbonates, alkaline earth metal carbonates, alkaline benzoates, earth-alkaline benzoates and polytetrafluoroethylene.

A suitable amount is utilized for increasing the Heat Distortion Temperature (HDT) of the composition containing the aforementioned agent as compared to the composition absent the agent where the heat distortion temperature is measured by ISO 75-1 test and the increase in HDT is from about 5 to about 20, preferably greater than 10, Centigrade degrees. ISO 75-1 test from International Standard, First Edition, dated Sep. 15, 1993, entitled "Plastics—Determination of temperature of deflection under load", is performed according to the general principle "A standard test specimen is subjected to a bending stress to produce one of the nominal surface stresses given in the relevant port of this International Standard. The temperature is raised at a uniform rate, and the temperature at which a specified deflection occurs is measured.

Talc which has a CAS number of 14807-96-6 is a natural hydrous magnesium silicate. As set forth in the Condensed Chemical Dictionary, Eleventh Edition, 1987, Van Nostrand Reinhold, N.Y., the chemical formula is typically written as $Mg_3Si_4O_{10}(OH)_2$ or $3MgO.4SiO_2.HOH$. Compact, massive varieties may be called steatite in distinction from the foliated varieties, which are called talc. Soapstone is an impure variety of steatite. Talc is a white, apple green, gray powder with luster pearly or greasy with a Mohs hardness of 1–1.5. Talc preferable has a particle size from about 0.5 to about 10 microns. It has a high resistance to acids, alkalies and heat. Preferably sufficient talc is utilized to increase the Heat Distortion temperature according to ISO 75-1 test by about 5 to about 20 degrees Centigrade. Preferably talc is used in an amount from about 0.03 to about 0.0001, preferably from 0.001 to about 0.005 parts by weight ("pbw") based on the total weight of composition.

In the case of a 20 percent glass composition where the alkylene aryl polyester is poly(1,4-butylene terephthalate) resin and the core-shell ASA is a poly butylacrylate rubber substrate with a graft of styrene and acrylonitrile, the addition of talc has resulted in 1) faster crystallization time via ½ time measured in an isothermal crystallization via DSC (temperature profile from 40° C. to 260° C. at 320° C./min, holding time 5 min then from 260° C. to 213° C. at 200° C./min, no holding time and finally from 213° C. to 208° C. at 10° C./min, holding time 10 min): from 20 min in a blend without any nucleating agent to 2–3 min with nucleating agent (from 0.1% to 0.5%), and 2) higher heat performances—Heat Distortion Temperature, tested according ISO 75-1, from 146° C. for a blend without nucleating agent to 152–160° C. for a Glass filled PBT-ASA blend with 0.1–0.5%.

A suitable salt of a carboxcylic acid may also be utilized as an agent for enhancing heat distortion temperature. The salt of a carboxcylic acid preferable comprises an alkyl group of 1 to about 20 carbon atoms terminating in a carboxyl group. Preferred salts are salts of alkali and alkaline earth metals with sodium being preferred. Sodium benzoate is preferred.

A suitable salt of a polyesteramide (PEA) may also be utilized as an agent for enhancing heat distortion temperature. PEA having a substantially uniform structure are preferable and are derived from diacid derivatives, diols and diamines. The preferred PEA contain the general formula (I):

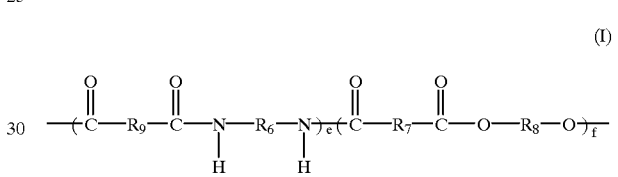

wherein $R_6$, $R_7$, $R_8$, and $R_9$ are independently $C_{1-20}$ alkylene or $C_{6-20}$ arylene and wherein e and f are each an integer greater than or equal to 1. Preferably, $R_7$ and $R_9$ are the same and are arylene, preferably a para-phenylene radical and preferably $R_6$ and $R_8$ are the same and are $C_{2-6}$ alkylene. It is preferable for e to be 1 or a mixture of 1 and higher integers wherein the fraction of said higher integers is less than about 15%, and more preferably less than about 10%. It is also possible for e and f to each be 1, in which case the resulting polymer would be a purely alternating polyesteramide. It is also preferable for the ratio of e/f to be between about 0.005 and about 1, more preferably between about 0.05 and 0.5, and for the PEA to have an inherent viscosity $[\eta_{inh}]$ exceeding 0.4 dl/g, as determined in phenol/tetrachloroethane (50:50 vol) at 25° C. using a solution of 0.5% w/v solution.

In formula (I), when R7 and $R_9$ are the same, preferably para-phenylene, the polymer comprising units of formula (I) can be referred to as a Pst, wherein s refers to the number of carbon atoms in $R_8$, and t refers to the number of carbon atoms in $R_6$. For example, the PEA derived from 1,4-butanediol and tetramethylenediamine as the diol and diamine respectively would be referred to as P44 and the PEA derived from 1,2-ethanediol and tetramethylenediamine would be referred to as P24. To designate the mole percentages of diamine based on the total of diol and diamine, the mole percentage of diamine is commonly designated as Pst-%. According to this nomenclature scheme, a PEA derived from tetramethylenediamine and 1,2-ethanediol wherein the tetramethylenediamine is at a level of 20 mole percent, would be referred to as P24-20.

In a preferred embodiment, the carbonyl species is a bis-carbonyl species and the resultant amide of formula (I) comprises units represented by the general formula (II):

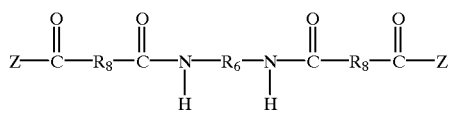

(II)

wherein Z is either a leaving group capable of being displaced by a hydroxyl or amino group or other nucleophilic species. Preferably, Z is a halogen, typically chlorine, or a hydroxyl group, or an alkoxy or aryloxy such as, for example, phenoxy, methoxy, or ethoxy. In formula (II), $R_6$ is as previously defined in formula (I), and each $R_8$ independently is generally $C_{1-20}$ alkylene, or $C_{1-20}$ arylene, or mixtures of the foregoing. Preferably $R_6$ is a 1,2-ethylene or 1,4-butylene group and each $R_8$ is para-phenylene.

When Z is an alkoxy or aryloxy group in formula (II), the resultant formula can be referred to as a "bisester diamide" (referred to as BEDA hereinafter), e.g., a bisester diamide based on terephthalic acid or its derivative and diamine or its derivative.

For purposes of simplicity and future reference in the examples, in formula (II) when Z is methoxy, $R_8$ is p-phenylene, and $R_6$ is tetramethylene, the resulting compound is abbreviated as T4T-dimethyl. Similarly, in formula (II) when Z is methoxy, $R_8$ is p-phenylene, and $R_6$ is hexamethylene or ethylene, the resulting compounds are abbreviated as T6T-dimethyl and T2T-dimethyl, respectively.

The term alkylene aryl polyester refers to crystalline polyesters such as polyesters derived from an aliphatic or cycloaliphatic diols, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

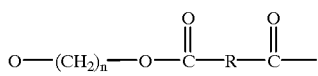

wherein n is an integer of from 2 to 6. R is a $C_6$–$C_{20}$ aryl radical comprising a decarboxylated residue derived from an aromatic dicarboxylic acid.

Examples of aromatic dicarboxcylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4- 1,5- or 2,6-naphthalenedicarboxylic acids. The preferred dicarboxcylic acids are terephthalic acid, isophthalic acid, naphthalene dicarboxcylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and poly(propylene terephthalate) ("PPT").

Also contemplated herein are the above polyesters with minor amounts, e.g., from about 0.5 to about 5 percent by weight, of units derived from aliphatic acid and/or aliphatic polyols to form copolyesters. The 10 aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, or polyester-forming derivatives therefore.

The polyesters used herein have an intrinsic viscosity of from about 0.4 to about 2.0 dl/gas measured in a 60:40 phenol/tetrachloroethane mixture or similar solvent at 23°–30° C. VALOX Registered TM 315 polyester is particularly suitable for this invention having an intrinsic viscosity of 1.1 to 1.4 dl/g.

Blends of polyesters may also be employed in the composition. As indicated earlier, preferred polyesters are poly(ethylene terephthalate) and poly(1,4-butylene terephthalate).

The term core-shell ASA (acrylate-styrene-acrylonitrile interpolymer) refers to a thermoplastic resin which comprises a styrene-acrylonitrile matrix in which is dispersed an acrylate elastomer phase as impact modifier. ASA is a multi-phase composite interpolymer comprising about 25 to 95 weight percent of a first elastomeric phase and about 75 to 5 weight percent of a final rigid thermoplastic phase.

The first phase or stage is polymerized from about 75 to 99.8 weight percent $C_2$ to $C_{10}$, preferably a $C_4$–$C_6$, most preferably a $C_4$ alky (meth) acrylate resulting in an acrylic rubber core having a $T_g$ below about 10 degrees C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer.

The final phase or stage monomer system can be comprised of $C_1$ to $C_{16}$ methacrylate, styrene, acrylonitrile, alkyl acrylates, allyl methacrylate, diallyl methacrylate, and the like, as long as the over $T_g$ is at least 20 degrees C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl amino, and amide groups. One or more intermediate phases are optional, for example a middle stage polymerized from about 75 to 100 percent by weight styrene.

Advantageous ASA resins which are commercially available comprise a crosslinked (meth)acrylate elastomer, a crosslinked styrene-acrylonitrile copolymer and a substantially linear styrene-acrylonitrile copolymer. Methylated styrenes such as alpha-methylstyrene or vinyltoluene may be used in place of all or part of the styrene, and it is understood that when styrene is mentioned hereinafter, these methylated styrenes are encompassed. The preferred resins of the ASA type are composed of core-shell impact modifiers in a styrene-acrylonitrile (SAN) matrix. The meth acrylate elastomer core portion of these resins may be composed of alkyl, aryl, or arylalkyl esters of acrylic or methacrylic acids. Preferably the alkyl (meth)acrylate alkyl is $C_2$ to $C_{10}$ with the butyl $C_4$ being most preferred, i.e. the core comprises a poly butylacylate rubber. The core shell portion of the resin may be prepared by a two-step process in which the (meth) acrylate elastomer core (which is often slightly crosslinked with polyfunctional vinyl compounds) is covered with a thermoplastic shell of polymethyl methacrylate, polystyrene, styrene-acrylonitrile copolymer, or similar vinyl polymers or copolymers.

The compositions may or may not have a comonomer to graft the core shell structure together. These ASA resins may be made for instance by the process of U.S. Pat. No. 3,944,631 (March 1976). The most preferred resins of this group comprise about 15 to about 90% of an uncrosslinked matrix of acrylonitrile-styrene copolymer polymerized and partly grafted on a core-shell impact modifier, typically about 5 to 50% of a crosslinked (meth)acrylate elastomer core with about 15 to about 35% of a crosslinked styrene-acrylonitrile copolymer shell. The crosslinking monomer may be typically a diacrylate of a diol. The shell and core are believed to be linked by having interpenetrating molecular networks, and the term interpolymer is applied to such products having such networks.

Other ASA resins which may be advantageously used in the composition of the invention are the types disclosed in U.S. Pat. Nos. 3,655,824, 3,830,878, 3,991,009, 4,433,102, 4,442,263, 4,096,202 and, 4,409,363, all of which are incorporated herein by reference thereto. These ASA resins have in common the use of the three monomers, namely acrylate ester, styrene (or alpha-methylstyrene), and acrylonitrile, to make a thermoplastic with good impact, heat distortion and weathering characteristics. They differ principally in the method of manufacture and in the detailed structure of the essential rubbery phase and the interphases if any. As a class the ASA resins have relatively similar blending properties in view of their outer continuous phase of acrylonitrile-styrene copolymer.

The polyester/ASA/talc resin blend preferable consist essentially of the polyester, ASA and talc ingredients. The blend comprised about 10 to 90, more preferably 20 to 80, most preferably 30 to 70 pbw polyester per part of resin blend.

The present molding compositions are reinforced or stiffened by the inclusion of a fibrous glass, preferably glass fibers, in amounts ranging from about 3 to 50 pbw of the total composition, preferably from about 7 to about 45 pbw, more preferably from about 10 to about 40 pbw.

The most preferable resin blend optionally includes from 0 to about 30, more preferably from 3 to 10 pbw of vinyl aromatic-vinyl cyanide copolymer. The perferred SAN composition comprises 15 to 30, more preferably 25–28, percent by weight AN with the remainder styrene, paramethystyrene, alpha methyl styrene. Vinyl compounds include styrene and alpha-methyl styrene. The vinyl cyanide compound includes acrylonitrile and substituted vinyl cyanides such a methacrylonitrile. Preferably the copolymer is a styrene-acrylonitrile copolymer (SAN). The preferred SAN is copolymer with the vinyl cyanide being present from about 20 to about 40 pbw based on total weight of the SAN. In the resin portion of the composition, it is desirable to have from about 15 to about 30, and preferable from about 25 to about 28 pbw free SAN based on the total amount of SAN present in the resin portion of the composition.

The glass fiber or filamentous glass employed as reinforcement in the present compositions, preferably comprise lime-aluminum borosilicate glass that is relatively soda-free. The filaments are made by standard processes, e.g., by steam or air blowing, flame blowing and mechanical pulling. For compositions ultimately to be employed for electrical uses, it is preferred to use fibrous glass filaments comprised of borosilicate glass that is relatively soda-free. This is known as "E" glass. The filaments are made by standard processes, e.g., by steam or air blowing, flame blowing and mechanical pulling.

The preferred filaments for plastic reinforcement are made by mechanical pulling. The filament diameters range from about 3 to 30 microns but this is not critical to the present invention. The filament diameters preferably range from about 6–20 microns. Use of equivalent non-round fiber cross section is also possible.

The length of the glass filaments and whether or not they are bundled into fibers and the fibers bundled in turn into yarns, ropes or rovings, or woven into mats and the like are also not critical to the invention. In preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125 (⅛").

The composition of the present invention may include additional components which do not interfere with the previously mentioned desirable properties but enhance other favorable properties.

Flame-retardant additives may be present in an amount sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bisphthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularity inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics.

The blends of this invention can be processed by various techniques including injection molding, blow molding, extrusion into sheet, film or profiles, compression molding and etc. They can also be formed into a variety of articles for use in, for example; electrical connectors, electrical devices, computers, building and construction, outdoor equipment, trucks and automobiles. Illustrative of the various molded articles are connectors, outdoor electrical enclosures and cabinets, structural parts in outdoor lighting applications, telecom enclosure housings, industrial power plugs. Important applications are electrotechnical and electronic applications, connectors, fuse boxes and other parts involved in the automotive internal electronics, and outdoor and indoor electrotechnical and telecom enclosures.

EXAMPLES

The following examples illustrate the present invention, but are not meant to be limitations to the scope thereof.

The formulations shown below were pre blended and extruded on an intermeshing-corotating twin-screw extruder (ZSK 25) at a die head temperature between 250° C. and a screw speed of 300 rpm. The Examples show the respective amount of addition of talc addition to the composition of the control. Test parts were injection molded on a Demag 85 tons injection molding machine with approximately 240–260° C. The resin was dried for 3–4 hours at 120° C. prior to injection molding.

TABLE A

Formulations of Glass filled PBT-ASA with higher HDT trough addition of Talc

| Raw Material | Control | Example 1 with 0.1% talc | Example 2 with 0.2% talc | Example 3 with 0.3% talc | Example 4 with 0.4% talc | Example 5 with 0.5% talc |
| --- | --- | --- | --- | --- | --- | --- |
| PBT 1 | 40.5 | | | | | |
| PBT 2 | 17.05 | | | | | |
| SAN | 7 | | | | | |
| ASA | 15 | | | | | |
| PETS | 0.3 | | | | | |
| Irganox 1076 | 0.15 | | | | | |
| Talc M154 | | 0.1 | 0.2 | 0.3 | 0.4 | 0.5 |
| Glass Fiber | 20 | | | | | |

TABLE A-continued

Formulations of Glass filled PBT-ASA with higher HDT trough addition of Talc

| Raw Material | Control | Example 1 with 0.1% talc | Example 2 with 0.2% talc | Example 3 with 0.3% talc | Example 4 with 0.4% talc | Example 5 with 0.5% talc |
| --- | --- | --- | --- | --- | --- | --- |
| Properties | | | | | | |
| HDT, (° C.) 1.82 Mpa | 145.5 ± 2.5 | 152.6 ± 2.1 | 152.2 ± 2.3 | 153.8 ± 2.2 | 157.1 ± 0.5 | 160.5 ± 3.0 |
| Crystallisat. Time (min) | 20.3 | 3.2 | 2.2 | 2.5 | 2.2 | 2.1 |

PBT 1 is a linear polyester produced by G.E. Plastics, with an IV (measured at 30° C. in 60/40 phenol/TCE) of: 0.68.

PBT 2 is a linear polyester produced by G.E. Plastics, with an IV (measured at 30° C. in 60/40 phenol/TCE) of: 1.12

SAN stays for a styrene acrylonitrile, produced by GE Plastics, with and IV (measured at 30° C. in 60/40 phenol/TCE) of 0.57 and an acrylonitrile content of 34%.

ASA is a polybutylacrylate rubber (substrate) produced in a continuous emulsion process with a graft on this substrate of styrene and acrylonitrile.

BA substrate latex sample characteristics: particle size: 2500–2900 Å, % solid: 37–41%,

ASA HRG: 18.2 AN: 18.2, % ST: 36.0, BA: 45.8.

Concerning the range with improved results. Formulations with +0.1 to +0.2% talc show HDT improvement of +7° C. Formulations with +0.5% talc show HDT improvement of +15° C. In fact an increase of more than 10° C. can be seen when more than +0.4% talc M15

Comments on Talc of pages 14 should be kept.

TABLE B

Formulations of Glass filled PBT-ASA with higher HDT trough addition of several additives:

| | HDT 1.82 Mpa (° C.) |
| --- | --- |
| Formulation 1 | 145.5 |
| Formulation 1 with 0.5% Pigment Green 7 | 170.0 |
| Formulation 1 with 4.0% Polyesteramide P44-5 | 176.5 |
| Formulation 1 with 0.5% $Na_2CO_3$ | 174.0 |
| Formulation 1 with 0.5% Sodium Benzoate | 177.5 |
| Formulation 1 with 0.5% T4T | 171.5 |
| Formulation 1 with 0.5% encapsulated PTFE | 167.0 |

* Pigment Green 7 is purchased from BASF as Heliogen Green K8730,
* Encapsulated PTFE is produced by G. E. Plastics Europe under the Trade Name T-SAN,
* P44-5 is a polyesteramide based on PBT in which 5% of the butanediol groups are replaced by butanediamine, produced by G. E. Plastics Mount-Vernon as polyesteramide P44-5.
* T4T is N,N'-bis-(methoxycarbonylbenzoyl)-1,4-butanediamine
* Sodium Carbonate is supplied by MERCK
* Sodium Benzoate is supplied by ACROS

What is claimed is:

1. A thermoplastic resin composition having enhanced heat distortion temperature comprising glass and a resin blend consisting essentially of an alkylene aryl polyester, a core-shell ASA (acrylate-styrene-acrylonitrile interpolymer) and an effective amount of a suitable heat distortion enhancing agent for increasing the heat distortion temperature of the composition from about 5 to about 20 Centigrade degrees as determined by ISO75E test compared to said composition absent said agent; wherein said agent is selected from the group consisting of a salt of carboxylic acid and polyesteramide.

2. A thermoplastic resin composition according to claim 1 wherein the said resin blend comprises about 10 to 90 pbw polyester per part of resin blend.

3. A thermoplastic resin composition according to claim 2 including fibrous glass in an amount from about 3 to 50 pbw of the total composition.

4. A thermoplastic resin composition according to claim 3 wherein said agent is present in an amount from 0.001 to about 0.0005 and comprises talc.

5. A thermoplastic resin composition according to claim 3 having repeating units of the following general formula:

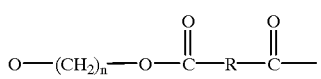

wherein n is an integer of from 2 to 6 and R is a $C_6$–$C_{20}$ aryl radical comprising a decarboxylated residue derived from an aromatic dicarboxylic acid.

6. A thermoplastic resin composition according to claim 5 polyesters are poly(ethylene terephthalate) and poly(1,4-butylene terephthalate).

7. A thermoplastic resin composition according to claim 3 wherein said ASA resin is a resin having a styrene-acrylonitrile matrix and a core-shell impact modifier of which the shell is styrene-acrylonitrile copolymer and the core is a crosslinked butyl (meth)acrylate rubber.

8. A thermoplastic resin composition according to claim 3 wherein said ASA resin comprises about 15 to about 90% of an uncrosslinked matrix of acrylonitrile-styrene copolymer polymerized and partly grafted on a core-shell impact modifier which comprises about 5 to 50% of a crosslinked (meth)acrylate elastomer core and about 15 to about 35% of a crosslinked styrene-acrylonitrile copolymer shell.

9. A thermoplastic resin composition according to claim 3 from about 95 to about 99.1 weight % of an ASA resin having a styrene-acrylonitrile matrix and a core-shell impact modifier of which the shell is styrene-acrylonitrile copolymer and the core is a crosslinked butyl (meth)acrylate rubber.

10. A thermoplastic resin composition according to claim 3 wherein the said resin blend comprises about 20 to 80 pbw polyester per part of resin blend.

11. A thermoplastic resin composition according to claim 3 including fibrous glass in an amount from about 7 to about 45 pbw of the total composition.

12. A thermoplastic resin composition according to claim 3 blend optionally includes from 0 to about 30 pbw of non-alkyl substituted vinyl aromatic-vinyl cyanide copolymer.

13. A thermoplastic resin composition according to claim 12 blend optionally includes from about 3 to 10 pbw of non-alkyl substituted vinyl aromatic-vinyl cyanide copolymer.

14. A thermoplastic resin composition according to claim 12 wherein said ASA comprises a multi-phase composite interpolymer comprising about 25 to 95 weight percent of a first elastomeric phase polymerized from a monomer system comprising about 75 to 99.8% by weight $C_1$ to $C_6$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 weight percent of a final, rigid thermoplastic phase polymerized in the presence of said elastomeric.

15. A method for improving the heat distortion properties of a thermoplastic composition of claim 1 comprising compounding:
(a) a glass and a resin blend consisting essentially of an alkylene aryl polyester, a core-shell ASA (acrylate-styrene-acrylonitrile interpolymer);
(b) an effective amount of a suitable heat distortion enhancing agent for increasing the heat distortion temperature of the composition from about 5 to about 20 Centigrade degrees as determined by ISO751-1 test compared to said composition absent said agent; wherein said agent is selected from the group consisting of a salt of carboxvlic acid and polyesteramide.

16. A method as defined in claim 15 wherein said polyester resin comprises units of an aliphatic diol, a cycloaliphatic diol or a mixture of such diols and an aromatic diacid.

17. A method as defined in claim 15 wherein said polyester resin consist essentially of a poly(1,4-butylene terephthalate).

18. A method as defined in claim 16 wherein said agent is present in an amount from 0.001 to about 0.0005 and comprises talc.

19. A method as defined in claim 16 wherein said wherein said ASA resin is a resin having a styrene-acrylonitrile matrix and a core-shell impact modifier of which the shell is styrene-acrylonitrile copolymer and the core is a crosslinked butyl (meth)acrylate rubber.

20. A method as defined in claim 16 wherein said ASA resin comprises about 15 to about 90% of an uncrosslinked matrix of acrylonitrile-styrene copolymer polymerized and partly grafted on a core-shell impact modifier which comprises about 5 to 50% of a crosslinked (meth)acrylate elastomer core and about 15 to about 35% of a crosslinked styrene-acrylonitrile copolymer shell.

21. A method as defined in claim 16 wherein said method further comprises compounding into the composition an additive selected from the group consisting of flame retardants, drip retardants, dyes, pigments, stabilizers, plasticizers, nucleants, reinforcers, rubbery impact modifiers and mixtures of any of the foregoing.

22. A method as defined in claim 15 wherein said compounding comprises melt blending or milling.

23. A method for making an article, comprising extruding and thermoforming, extruding or molding the composition as defined in claim 1.

24. An article made by the process of claim 23.

25. An article according to claim 23, wherein the article comprises a component for electrical devices, building and construction component, or outdoor equipment component.

26. An article according to claim 25, wherein the article comprises an electrical connector, housing for an electrical devices, computer housing, outdoor electrical enclosures, structural part for outdoor lighting applications, telecom enclosure.

27. An article according to claim 26, wherein the article comprises an automobile component comprising a housings, connector or fuse box.

* * * * *